United States Patent

[11] 3,558,984

| [72] | Inventors | John Walter Freeman Smith;<br>Frederick Martin Gray, Stafford, England |
|---|---|---|
| [21] | Appl. No. | 731,232 |
| [22] | Filed | May 22, 1968 |
| [45] | Patented | Jan. 26, 1971 |
| [73] | Assignee | The English Electric Company Limited<br>London, England<br>a British company |
| [32] | Priority | May 23, 1967 |
| [33] | | Great Britain |
| [31] | | 23842/67 |

[54] A.C. SYSTEM FAULT INDICATOR
4 Claims, 1 Drawing Fig.

[52] U.S. Cl. .................................................. 317/23,
317/18, 317/33
[51] Int. Cl. ................................................ H02h 7/26,
H02h 3/16
[50] Field of Search .......................................... 317/22, 23,
18, 33, 36; 336/84(Inquired)

[56] References Cited
UNITED STATES PATENTS

| 3,187,282 | 6/1965 | Pierce et al. .................. | 336/84X |
| 3,319,125 | 5/1967 | Gilker .......................... | 317/23X |
| 3,418,575 | 12/1968 | Spindle ........................ | 336/84X |

Primary Examiner—James D. Trammell
Attorneys—Misegades & Douglas, Keith Misegades and George R. Douglas, Jr.

ABSTRACT: This invention relates to an AC system fault indicator, and more particularly relates to a fault indicator for overhead distribution lines, the fault indicator itself derives its electrical energy from the capacitive leakage currents through post insulators on which the line conductors are supported. A control circuit powered by this energy includes sensing coils mounted within the insulators and adjacent the conductors, the coils being operative to monitor the current through the line and an alarm circuit is provided which is operative in response to an abnormal value of the current indicative of a faulty system to effect an alarm function and to nullify this function in response to the restoration of current values indicative of a healthy system. The overhead line may be polyphase, the abnormal current being indicative of either an overload, or earth faults resulting in phase unbalance.

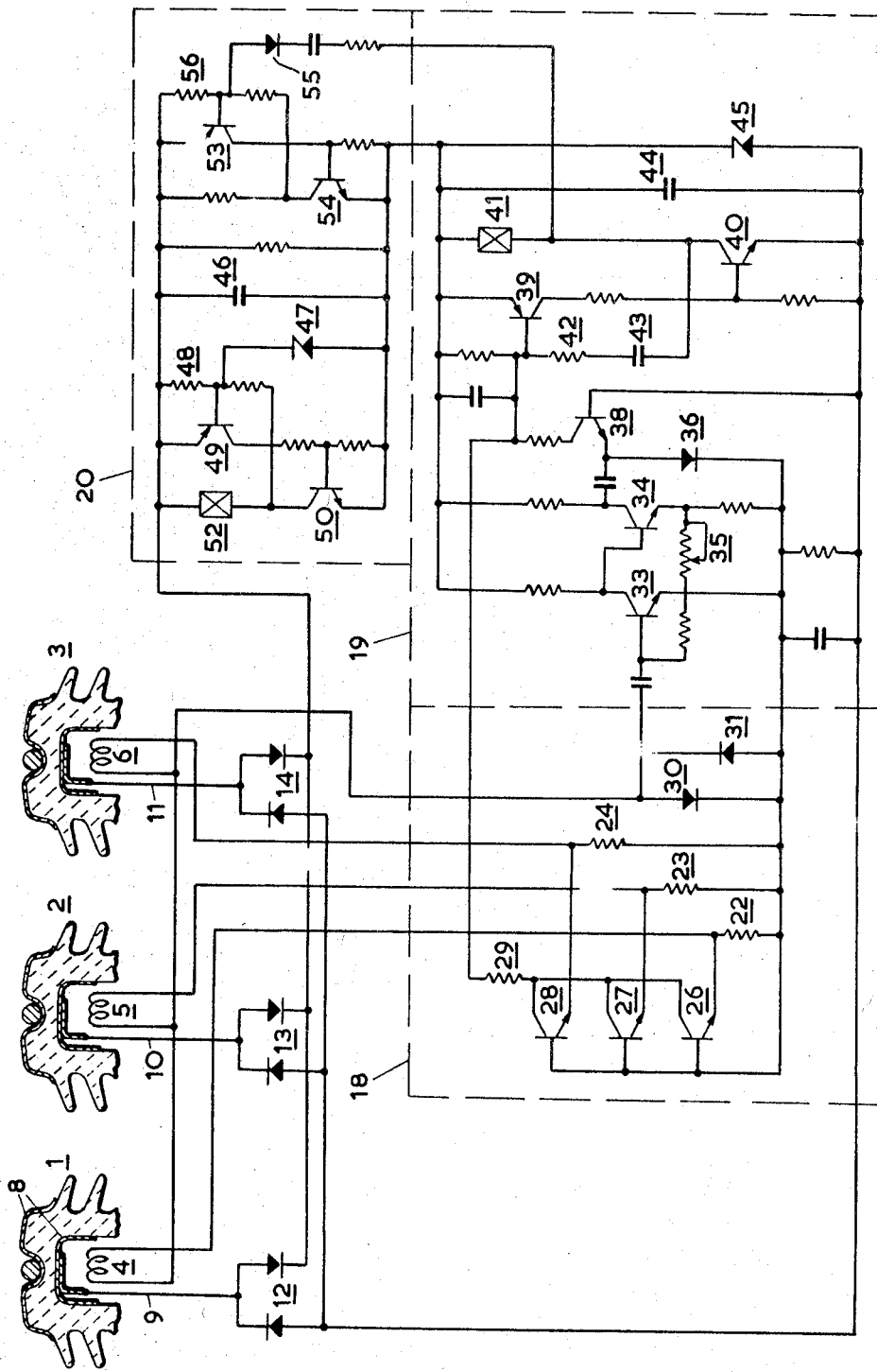

A.C. SYSTEM FAULT INDICATOR

This invention relates to an AC system fault indicator, and more particularly relates to a fault indicator for overhead distribution lines, e.g. 11 kilovolt systems.

From one aspect the present invention consists in a fault indicator for an AC system comprising means for deriving electrical energy from capacitive leakage currents through a dielectric medium insulating the conductors, and a control circuit powered by said energy including sensing members mounted adjacent the conductors for monitoring the current therethrough and an alarm circuit operative in response to an abnormal value of said current indicative of a faulty system to effect an alarm function and to nullify said function in response to the restoration of current values indicative of a healthy system.

The AC system may be a polyphase overhead line, the abnormal current being indicative of either an overload, or earth faults resulting in phase unbalance. For this purpose the outputs from the sensing members may be separately determined in the control circuit for the former class of fault whereas for earth faults any residual current in a common star point of these members is detected.

The alarm function may be realized by a 'flag' indicator tripped in response to the detection of the abnormal current, the electrical energy for effecting this being derived from a capacitor charged by the aforesaid leakage current through the line insulators. Similarly, the alarm will be shutoff upon the restoration of normal conditions by the flag indicator being reset, the necessary electrical energy for this again being derived from a capacitor charged by the leakage currents.

This "resetting" function may be performed repeatedly whilst the line is energized, at intervals determined by the time for the 'reset' capacitor to charge to a predetermined level, an interlock circuit being provided to ensure that a trip function overrides the reset function should a fault occur at an instant of 'reset'.

This invention thus provides a permanent fault indicator several of which may be mounted at intervals along a distribution line for enabling the path of a fault to be readily recognized by observation of the flag indicators. The indicators are completely automatic in operation obviating the need for manual reset and no batteries need be installed since all the energy necessary for flagging and reset is derived from the capacitive currents from the line itself. The current available from this source may only be of the order of 100 microamps but the control circuit is designed to operate reliably at this level, the capacitors being charged from this low current supply and then delivering all their stored energy in a short period to actuate the flag indicator when required. Earth faults as low as 5 amps affecting an 11 KV. system may readily be detected by this circuit.

In order that the invention can be fully understood, one embodiment thereof will now be described, by way of example, with reference to the accompanying drawing which shows a detailed circuit diagram of the fault indicator.

Referring now to the drawing a three phase 11 KV. overhead power transmission line is supported on insulators 1, 2 and 3. Each insulator is formed with a cavity for accommodating one of three corresponding search coils 4, 5, 6 and a conductive coating 8 extends over opposed portions of these insulators. Also mounted within the cavities in the insulators are three conductors 9, 10, 11 which firmly engage the inner conductive coating 8 and for this purpose they may conveniently be spring-biased against this surface.

The three conductors 9—11 are respectively connected to three arms 12, 13, 14 in a rectifier bridge network which is operative to rectify the capacitive leakage current through the insulators and thereby derive a power source for the fault indicator proper. In turn, one side of all three search coils 4—6 is commoned whilst the other sides are taken separately from the insulators.

The fault indicator basically comprises a fault sensing circuit 18, a tripping circuit 19 and a reset circuit 20.

The fault-sensing circuit 18 is operative to respond to either phase-to-phase faults or earth faults affecting any of the lines. Phase faults, and severe earth faults, will result in a current flow through the appropriate one or more of resistors 22, 23 and 24 connected to the search coils of a magnitude designed to exceed the base-emitter threshold voltage of transistors 26, 27, 28 to which they are connected, resulting in current flow through their common collector load resistor 29. On the other hand, low current earth faults which, save in exceptional circumstances, will be unbalanced, will be detected by residual current flow in the commoned connection of the three search coils.

Considering this latter condition, any residual output across the coil-resistor combination is applied across two opposed voltage-limiting diodes 30, 31 and is amplified by transistors 33, 34, the degree of feedback being adjustable by a variable resistor 35 so as to closely control the amplifier gain.

The output from transistor 34 has its positive-going excursion limited by a diode 36 and is effective to switch-on transistor 38 when its base-emitter junction is forward-biassed, that is, when the negative excursion of this signal exceeds the negative base potential. In turn, the output from transistor 38 is operative to switch-on transistor 39 the base circuit of which is common to the collector circuit of transistors 26—28.

Transistor 39 together with the transistor 40 coupled to its collector circuit form a latching network incorporating a time delay to ensure that relay coil 41 which trips, for example, a flag indicator and is connected in the collector circuit of transistor 40, is energized for a period sufficient for this indicator to operate. In particular, this delay time is governed by the time constant of resistor 42 and capacitor 43, transistors 39 and 40 being held on until the charging current drops to a value below that required for latching. The energy required to energize the relay coil 41 is derived from a storage capacitor 44 which, together with a voltage-limiting Zener diode 45 is effectively connected in parallel with the coil when transistor 40 is conductive.

It will be evident that this latter circuitry is also operative for phase faults which directly influence the transistor 39 since it is connected in the collector circuit of transistors 26—28.

Thus, the tripping circuit 19 is effective to trip the flag indicator in the event of either phase or earth faults and reference will now be made to the circuit 20 which is operative to reset the indicator upon the restoration of power to the faulted system.

This reset circuit is connected in series with the tripping circuit and comprises a capacitor 46 which is charged by the supply current until a voltage level is reached which is sufficient to turn-on Zenor diode 47. Under this condition the voltage drop across resistor 48 is sufficient to cause transistor 49 to conduct which results in transistor 50 conducting also and the energization of a 'reset' relay coil 52 for resetting the flag indicator. The energy required for energizing this coil is derived from the capacitor 46 and because of the relatively small time constant of the coil circuit the capacitor will be discharged to a low voltage well below the Zener voltage of diode 47 and the circuit will revert to its original state before commencing another cycle.

The reset coil is thus periodically energized but the flag indicator will of course only be reset if it has previously been tripped.

In addition, it must be ensured that if the reset circuit is on the threshold of tripping at the instant of fault inception then the fault trip should override the reset function otherwise there is a risk of a false indication. In order to effect this an interlock circuit is provided comprising two transistors 53, 54 connected as a regenerative pair, the base of transistor 53 being returned through a diode 55 to the collector of transistor 40. Thus, in the event of this transistor conducting in response to a fault the diode 55 conducts and this results in a voltage drop across resistor 56 sufficient to switch on transistor 53. In turn, transistor 54 is switched on so that these two transistors provide a discharge path for the storage capacitor 46, shunting the reset coil circuit.

Upon the restoration of power following a fault, the capacitor 46 thus always commences to charge from its fully discharged state but in order to keep the period of the reset cycle short the value of capacitor 46 may be kept as small as possible compatible with its requirement for delivering the required energy to reset the flag indicator. The same considerations also apply to capacitor 44 in the trip circuit, since it is advantageous for the indicator to be responsive to faults as soon as possible after the line is energized.

It is to be understood that the invention is not limited to the specific arrangement described and many modifications may be introduced without departing from the scope of this invention. Furthermore, various associated mechanical features have not been disclosed in detail in the interest of clarity, thus, for example, provision may conveniently be made for the search coils and insulators to be relatively movable in order to facilitate the setting up procedure. In addition, reference has been made to a "flag" indicator but it is to be understood that other means of identification, visible or audible, may alternatively be employed.

We claim:
1. A fault indicator for an AC transmission line, comprising:
   an insulator structure which supports the line;
   sensing coil means mounted adjacent to the line;
   a tripping circuit operative in response to an output from the sensing coil means to effect an alarm indicating function should the line current exceed a predetermined limit;
   a reset circuit operative to nullify the alarm indicating function when the line current is within its predetermined limit; and
   energizing means for deriving power from leakage current through the insulator structure for energizing the tripping and reset circuits.

2. A fault indicator according to claim 1, for a polyphase overhead line, wherein the sensing coil means comprises a separate sensing coil for each phase of the line, and the tripping circuit includes a first detector to which the signals from the sense coils are applied collectively, for detecting earth faults resulting in a phase unbalance, and a second detector to which the signals from the sense coils are applied individually, for detecting phase faults.

3. A fault indicator according to claim 2, wherein the energizing means include a capacitor which is charged from the leakage current;
   the alarm indicating function is effected by an electromagnetic flag indicator having a trip coil and a reset coil; and
   the tripping circuit and the reset circuit each include respective latch means operative to ensure that, if the trip coil or reset coil is energized, it remains energized until the capacitor is substantially discharged.

4. A fault indicator according to claim 3, including an interlock circuit between the tripping circuit and the reset circuit to inhibit operation of the reset circuit during operation of the tripping circuit.